(12) United States Patent
Berni et al.

(10) Patent No.: US 8,747,795 B2
(45) Date of Patent: Jun. 10, 2014

(54) PROCESS FOR PRODUCTION OF NICKEL CARBONATE

(75) Inventors: Tiago Valentim Berni, Belo Horizonte (BR); Antonio Clareti Pereira, Belo Horizonte (BR); Felipe Hilario Guimarães, São José da Lapa (BR)

(73) Assignee: Vale S.A., Rio de Janeiro (BR)

( * ) Notice: Subject to any disclaimer, the term of this patent is extended or adjusted under 35 U.S.C. 154(b) by 253 days.

(21) Appl. No.: 13/430,362

(22) Filed: Mar. 26, 2012

(65) Prior Publication Data

US 2012/0269713 A1 Oct. 25, 2012

Related U.S. Application Data

(60) Provisional application No. 61/467,683, filed on Mar. 25, 2011.

(51) Int. Cl.
*C01G 53/06* (2006.01)

(52) U.S. Cl.
USPC ........................................ 423/419.1

(58) Field of Classification Search
CPC ........................................ C01G 53/06
USPC ........................................ 423/419.1
See application file for complete search history.

(56) References Cited

U.S. PATENT DOCUMENTS 7,897,069 B2 * 3/2011 Nakaoka .................... 252/521.2

* cited by examiner

*Primary Examiner* — Stuart Hendrickson
(74) *Attorney, Agent, or Firm* — Arent Fox LLP

(57) ABSTRACT

Aspects of the present invention refers to a process for production of nickel carbonate including preparing a magnesium salt solution, contacting the solution with a stream of gaseous $CO_2$, keeping pH between 4 and 10 and temperature between 0 and 100° C., during up to 5 hours to produce a first mixture, contacting the first mixture with a nickel sulphate solution to produce a second mixture, performing a separation of liquid and solid portions of the second mixture, and feeding the magnesium salt solution with the liquid portion. This process recycles the reagent used for producing nickel carbonate and yields a final product that is easy to handle and transport.

5 Claims, 1 Drawing Sheet

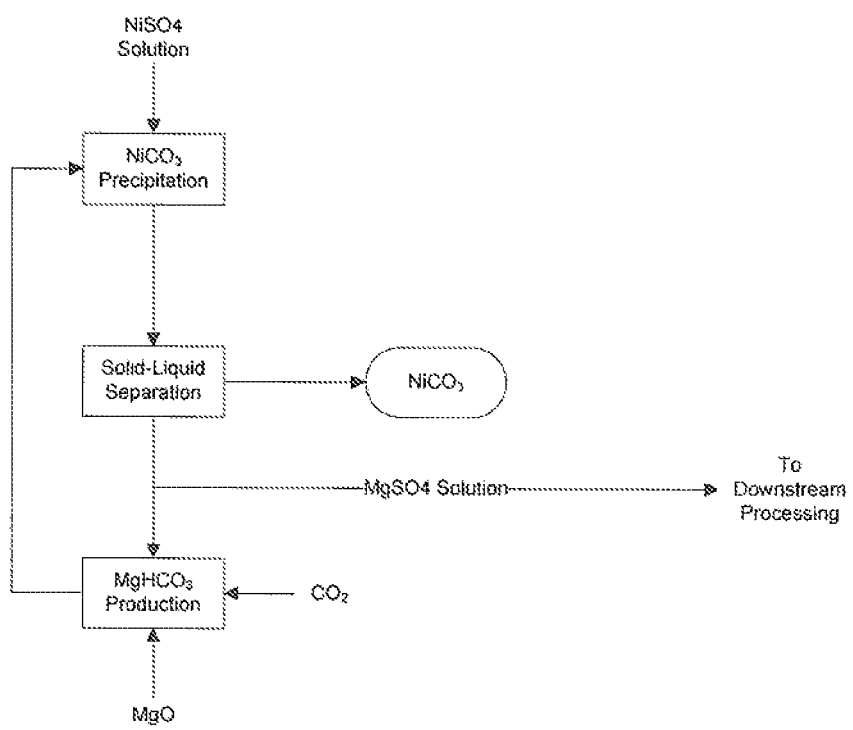

PROCESS FOR PRODUCTION OF NICKEL CARBONATE

The present application claims priority from U.S. Patent Application No. 61/467,683, titled "Process for Production of Nickel Carbonate," filed on Mar. 25, 2011, and which is incorporated herein by reference in its entirety.

FIELD OF THE INVENTION

The present invention refers to a process for production of nickel carbonate from magnesium bicarbonate comprising steps that consider the recycling of the reagent used for producing nickel carbonate.

BACKGROUND OF THE INVENTION

Nickel carbonate is a light green powder, odorless and solid, that dissolves in dilute acid and aqueous ammonia, but not in water and that, upon drying, ranges in size from a fine powder to agglomerated hard lumps. This compound is generally used to manufacture of other nickel salts, nickel catalysts, pigments and additive of ceramics.

There are some known processes for preparation nickel carbonate form different sources. However, such paths do not consider recycling of reagent and a precipitation step.

SUMMARY OF THE INVENTION

In light of the above described problems and unmet needs, aspects of the current invention provide methods of producing nickel carbonate including preparing a magnesium salt solution, contacting the solution with a stream of gaseous $CO_2$, keeping pH between 4 and 10 and temperature between 0 and 100° C., during up to 5 hours to produce a first mixture, contacting the first mixture with a nickel sulphate solution to produce a second mixture, performing a separation of liquid and solid portions of the second mixture, and feeding the magnesium salt solution with the liquid portion. This process recycles the reagent used for producing nickel carbonate and yields a final product that is easy to handle and transport. This process is particularly suitable for the mining Industry.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein:

FIG. 1 is a diagram illustrating a process of producing nickel carbonate according to various aspects of the current invention.

DETAILED DESCRIPTION OF THE INVENTION

The following detailed description does not intend to, in any way, limit the scope, applicability or configuration of the invention. More exactly, the following description provides the necessary understanding for implementing the exemplary modalities. When using the teachings provided herein, those skilled in the art will recognize suitable alternatives that can be used, without extrapolating the scope of the present invention.

The process of the present invention, as shown on FIG. 1, comprises the following steps:
 a) Preparing a magnesium salt solution;
 b) Contacting said solution with a stream of gaseous $CO_2$, keeping pH between 4 and 10 and temperature between 0 and 100° C., during up to 5 hours;
 c) Contacting the mixture of step b) with a nickel sulphate solution, producing a mixture;
 d) Performing a separation of liquid and solid portions of said mixture;
 e) Feeding step a) with said liquid portion.

The magnesium salt solution may preferably be a magnesium sulphate solution.

In order to favor gas-liquid gas contact, the contact of said solution with a stream of gaseous $CO_2$ preferably occurs in a packet column can be used or any other equipment that provides good contact between said solution and the stream of gaseous $CO_2$.

And the magnesium salt solution pH may be kept between 4 and 10, preferably 5 and 7. In this case, a neutralizing agent can be used, preferably a magnesium oxide. But any other one can be used as known by a person skilled on the art for this purpose.

The temperature may be kept between 0 and 10° C., and preferably between 10 and 30° C., since lower temperatures favor the production of $MgHCO_3$.

And the residence times may be up to five hours, preferably up to one hour.

The $MgHCO_3$ solution resulting from the contacting said solution with a stream of gaseous $CO_2$, preferably respecting the operation parameters here described, may be contacted with a nickel sulphate, producing a mixture containing liquid and solid portions, $MgSO_4$ solution and $NiCO_3$ precipitation, respectively.

The liquid and solid portions may be separated by any equipment or method capable of perform a solid-liquid separation.

The liquid portion, being a bleed of that $MgSO_4$ solution, may be sent back to step a) for producing more $MgHCO_3$.

The process for obtaining nickel carbonate of the present invention provides some benefits that follow:
 This process recycles the reagent used for producing nickel carbonate and yields a final product that is easy to handle and transport.
 Production of a cheap, easy to handle and transport, intermediate nickel product ($NiCO_3$);
 Increase synergies with other areas within Vale;
 Reduces costs of downstream processing of nickel;
 Exploit low-grade or small nickel deposits.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and thereof. Therefore, aspects of the invention are intended to embrace all known or later-developed alternatives, modifications, variations, improvements, and/or substantial equivalents.

The invention claimed is:
1. A process for production of nickel carbonate comprising the following steps:
 a) preparing a magnesium salt solution;

b) contacting said solution with a stream of gaseous $CO_2$ while keeping a pH between 4 and 10 and a temperature between 0 and 100° C. during up to 5 hours to produce a first mixture;
c) contacting the first mixture with a nickel sulphate solution to produce a second mixture;
d) performing a separation of liquid and solid portions of said second mixture;
e) feeding step a) with said liquid portion.

2. The process according to claim 1, wherein the magnesium salt solution is a magnesium sulphate solution.

3. The process according to claim 1, wherein the contacting of the magnesium salt solution with a stream of gaseous $CO_2$ occurs in a packet column.

4. The process according to claim 1, further comprising using a neutralizing agent in step b to the keep pH between 4 and 10.

5. The process according to claim 4, wherein the neutralizing agent is magnesium oxide.

\* \* \* \* \*